US008706781B2

(12) United States Patent
Morimoto et al.

(10) Patent No.: US 8,706,781 B2
(45) Date of Patent: Apr. 22, 2014

(54) APPARATUS AND METHOD FOR ENABLING CONTENT DATA TO BE COPIED OR MOVED IN ACCORDANCE WITH DESIRED TIME OR CAPACITY OF A STORAGE MEDIUM AND A PROGRAM THEREOF

(75) Inventors: Naoki Morimoto, Tokyo (JP);
Kenichiro Aridome, Kanagawa (JP);
Yukio Isobe, Kanagawa (JP); Atsushi Mae, Kanagawa (JP)

(73) Assignee: Sony Corporation (JP)

( * ) Notice: Subject to any disclaimer, the term of this patent is extended or adjusted under 35 U.S.C. 154(b) by 553 days.

(21) Appl. No.: 12/658,936

(22) Filed: Feb. 17, 2010

(65) Prior Publication Data
US 2010/0223304 A1 Sep. 2, 2010

(30) Foreign Application Priority Data
Feb. 27, 2009 (JP) ................................ P2009-047229

(51) Int. Cl.
*G06F 17/30* (2006.01)
(52) U.S. Cl.
USPC ........................... 707/812; 707/822; 707/823
(58) Field of Classification Search
USPC .............................. 707/823, 812, 822; 386/95
See application file for complete search history.

(56) References Cited

U.S. PATENT DOCUMENTS

| | | | | |
|---|---|---|---|---|
| 6,467,028 B1 * | 10/2002 | Kelley | ........................... | 711/129 |
| 6,615,192 B1 * | 9/2003 | Tagawa et al. | ................... | 705/57 |
| 6,636,953 B2 * | 10/2003 | Yuasa et al. | ................... | 711/161 |
| 7,376,336 B2 * | 5/2008 | Nakamura | ..................... | 386/341 |
| 7,835,622 B2 * | 11/2010 | Seo et al. | ....................... | 386/241 |
| 7,848,620 B2 * | 12/2010 | Park | .............................. | 386/241 |
| 8,078,033 B2 * | 12/2011 | Fujishima et al. | ............. | 386/250 |
| 8,195,616 B2 * | 6/2012 | Kasmirsky et al. | ............ | 707/665 |
| 2002/0129048 A1 * | 9/2002 | Qiu et al. | ....................... | 707/204 |
| 2004/0213105 A1 * | 10/2004 | Seo et al. | .................... | 369/47.16 |
| 2004/0213552 A1 * | 10/2004 | Kato | ................................ | 386/69 |
| 2004/0228609 A1 * | 11/2004 | Nakamura | ....................... | 386/46 |
| 2005/0021570 A1 * | 1/2005 | Thompson | ..................... | 707/200 |
| 2005/0100308 A1 * | 5/2005 | Moteki | ............................. | 386/4 |
| 2005/0102049 A1 * | 5/2005 | Smithers et al. | ................. | 700/94 |
| 2005/0175326 A1 * | 8/2005 | Kim et al. | ....................... | 386/126 |

(Continued)

FOREIGN PATENT DOCUMENTS

| | | | |
|---|---|---|---|
| EP | 1278134 A2 | 1/2003 | |
| EP | 1784011 A1 | 5/2007 | |

(Continued)

OTHER PUBLICATIONS

Partial European Search Report EP 10154094 dated Jun. 10, 2010.

*Primary Examiner* — Thanh-Ha Dang
(74) *Attorney, Agent, or Firm* — Lerner, David, Littenberg, Krumholz & Mentlik, LLP

(57) ABSTRACT

There is provided an information processing apparatus including a storage unit that stores content data, a movement instruction unit that provides instructions to move the content data stored in the storage unit in accordance with a user operation, a detection unit that detects characteristic information of the content data in accordance with movement instructions of the content data by the movement instruction unit, a basic interval setting unit that sets one or two or more basic intervals to the content data based on detection points of the characteristic information, and a data generation unit that generates content data for movement made of a plurality of the one or two or more basic intervals set by the basic interval setting unit.

15 Claims, 12 Drawing Sheets

(56) References Cited

U.S. PATENT DOCUMENTS

| | | | |
|---|---|---|---|
| 2005/0244137 A1* | 11/2005 | Takashima et al. | 386/69 |
| 2006/0028936 A1* | 2/2006 | Ninomiya et al. | 369/47.1 |
| 2006/0064717 A1* | 3/2006 | Shibata et al. | 725/37 |
| 2006/0110111 A1* | 5/2006 | Van Gestel et al. | 385/95 |
| 2006/0159416 A1* | 7/2006 | Park | 386/52 |
| 2006/0204229 A1* | 9/2006 | Onodera | 386/117 |
| 2006/0239130 A1* | 10/2006 | Momosaki et al. | 369/1 |
| 2006/0263045 A1* | 11/2006 | Horiguchi | 386/83 |
| 2006/0294115 A1* | 12/2006 | Armangau et al. | 707/100 |
| 2007/0064324 A1* | 3/2007 | Huang | 360/15 |
| 2007/0064557 A1* | 3/2007 | Huang | 369/47.12 |
| 2007/0110395 A1* | 5/2007 | Ishida et al. | 386/95 |
| 2007/0198932 A1* | 8/2007 | Uchimura | 715/723 |
| 2007/0206463 A1* | 9/2007 | Kuroda | 369/47.1 |
| 2007/0223872 A1* | 9/2007 | Huang et al. | 386/52 |
| 2007/0269187 A1* | 11/2007 | Morimoto et al. | 386/95 |
| 2007/0283442 A1* | 12/2007 | Nakano et al. | 726/26 |
| 2007/0292104 A1* | 12/2007 | Katano et al. | 386/52 |
| 2008/0049574 A1* | 2/2008 | Yahata | 369/47.13 |
| 2008/0072072 A1* | 3/2008 | Muraki et al. | 713/193 |
| 2008/0114953 A1* | 5/2008 | Takatsuka | 711/162 |
| 2008/0259173 A1* | 10/2008 | Yahata | 348/220.1 |
| 2008/0304706 A1* | 12/2008 | Akisada et al. | 382/103 |
| 2009/0003172 A1* | 1/2009 | Yahata et al. | 369/53.41 |
| 2009/0228508 A1* | 9/2009 | Date et al. | 707/102 |
| 2009/0237704 A1* | 9/2009 | Minowa | 358/1.14 |
| 2009/0238539 A1 | 9/2009 | Isobe et al. | |

FOREIGN PATENT DOCUMENTS

| | | |
|---|---|---|
| JP | 2005020283 | 1/2005 |
| JP | 2005236527 A | 9/2005 |
| JP | 2006012300 A | 1/2006 |
| JP | 2007048379 | 2/2007 |
| JP | 2007174185 A | 7/2007 |
| JP | 2008-033983 A | 2/2008 |
| WO | 2006011447 A1 | 2/2006 |

* cited by examiner

APPARATUS AND METHOD FOR ENABLING CONTENT DATA TO BE COPIED OR MOVED IN ACCORDANCE WITH DESIRED TIME OR CAPACITY OF A STORAGE MEDIUM AND A PROGRAM THEREOF

CROSS-REFERENCE TO RELATED APPLICATION

The present application claims priority from Japanese Patent Application No. JP JP 2009-047229 filed in the Japanese Patent Office on Feb. 27, 2009, the entire content of which is incorporated herein by reference.

BACKGROUND OF THE INVENTION

1. Field of the Invention

The present invention relates to an information processing apparatus, an information processing method, and a program, and in particular to an information processing apparatus, an information processing method, and a program for moving desired content data from recorded content data.

2. Description of the Related Art

With increasing recording capacities of disk-type recording media in recent years, camcorders of a type that stores moving images or still images in nonlinear media instead of conventional recording tape are emerging on the market. Nonlinear media can randomly be accessed and thus, desired scenes can efficiently be found out and also because data is accessed in a non-contact fashion, information recording media can be used without being deteriorated. For example, camcorders using DVD, HDD, or flash memory attract an increasing number of users year after year thanks to excellent image quality and ease of use such as editing capabilities.

When content such as moving images is recorded in an information recording medium, processing to together generate and record information different from entity data of the content according to a predetermined data format such as AVCHD is performed. The information different from entity data of the content is, for example, attribute information such as the size or reproduction time of content data or interval information set to content data. The interval information is a pair of information of a start point and an end point of a predetermined interval set for the content data.

A plurality of pieces of interval information can normally be set for one piece of content data. It is also possible to create a reproduction list (play list) by designating a plurality of intervals set for a plurality of content data or make a copy to another information recording medium. If, for example, a characteristic portion of moving image content recorded in an information recording medium is designated by user input, only an interval containing the characteristic portion can be collected and moved to another medium.

SUMMARY OF THE INVENTION

However, there is an issue that in order to move content data desired by the user to another medium, it is necessary for the user to search for a characteristic portion of the content data and repeat a copying operation. There is also an issue that it is difficult to move designated content data from content data recorded in accordance with the desired capacity or time.

In light of the foregoing, it is desirable to provide a novel and improved information processing apparatus, information processing method, and program capable of moving a digest of content data in accordance with the desired capacity or time.

According to an embodiment of the present invention, there is provided an information processing apparatus which includes a storage unit that stores content data, a movement instruction unit that provides instructions to move the content data stored in the storage unit in accordance with a user operation, a detection unit that detects characteristic information of the content data in accordance with movement instructions of the content data by the movement instruction unit, a basic interval setting unit that sets one or two or more basic intervals to the content data based on detection points of the characteristic information, and a data generation unit that generates content data for movement made of a plurality of the one or two or more basic intervals set by the basic interval setting unit.

According to the above configuration, the content data is instructed to be moved in accordance with a user operation, and characteristic information of the content data is detected. One or two or more basic intervals are set to the content data based on detection points of the detected characteristic information. Content data for movement made of a plurality of the set one or two or more basic intervals is generated. In this manner, a digest of content data can be moved in accordance with the desired capacity or time.

Further, the basic interval setting unit may set the detection point of the characteristic information as a start point of the basic interval and a point at which a predetermined time passes from the detection point of the characteristic information as an end point of the basic interval.

Further, when the plurality of basic intervals contained in the content data for movement is overlapped, the data generation unit may delete one of the overlapped basic intervals.

Further, the information processing apparatus may further include a recording unit that records the content data for movement generated by the data generation unit in a storage medium at a movement destination different from the storage unit, and an acquisition unit that acquires information about the storage medium at the movement destination. The data generation unit may generate the content data for movement based on the information about the storage medium at the movement destination acquired by the acquisition unit.

Further, the data generation unit may generate the content data for movement in accordance with a magnitude relation between a storage capacity of the storage medium at the movement destination and a data capacity of the content data.

Further, the data generation unit may generate the content data for movement in accordance with the storage capacity of the storage medium at the movement destination when the storage capacity of the storage medium at the movement destination is smaller than the data capacity of the content data.

Further, the data generation unit may generate the content data for movement in accordance with a medium type of the storage medium at the movement destination.

Further, the data generation unit may generate the content data for movement in accordance with the data capacity of the content data.

According to another embodiment of the present invention, there is provided an information processing method which includes the steps of providing instructions to move content data stored in a storage unit in accordance with a user operation, detecting characteristic information of the content data in accordance with movement instructions of the content data, setting one or two or more basic intervals to the content data based on detection points of the characteristic information, and generating content data for movement made of a plurality of the set one or two or more basic intervals.

According to another embodiment of the present invention, there is provided a program for causing a computer to function as an information processing apparatus, the information processing apparatus including a storage unit that stores content data, a movement instruction unit that provides instructions to move the content data stored in the storage unit in accordance with a user operation, a detection unit that detects characteristic information of the content data in accordance with movement instructions of the content data by the movement instruction unit, a basic interval setting unit that sets one or two or more basic intervals to the content data based on detection points of the characteristic information, and a data generation unit that generates content data for movement made of a plurality of the one or two or more basic intervals set by the basic interval setting unit.

According to the embodiments of the present invention described above, a digest of content data can be moved in accordance with the desired capacity or time.

DETAILED DESCRIPTION OF THE EMBODIMENTS

Figure 1:
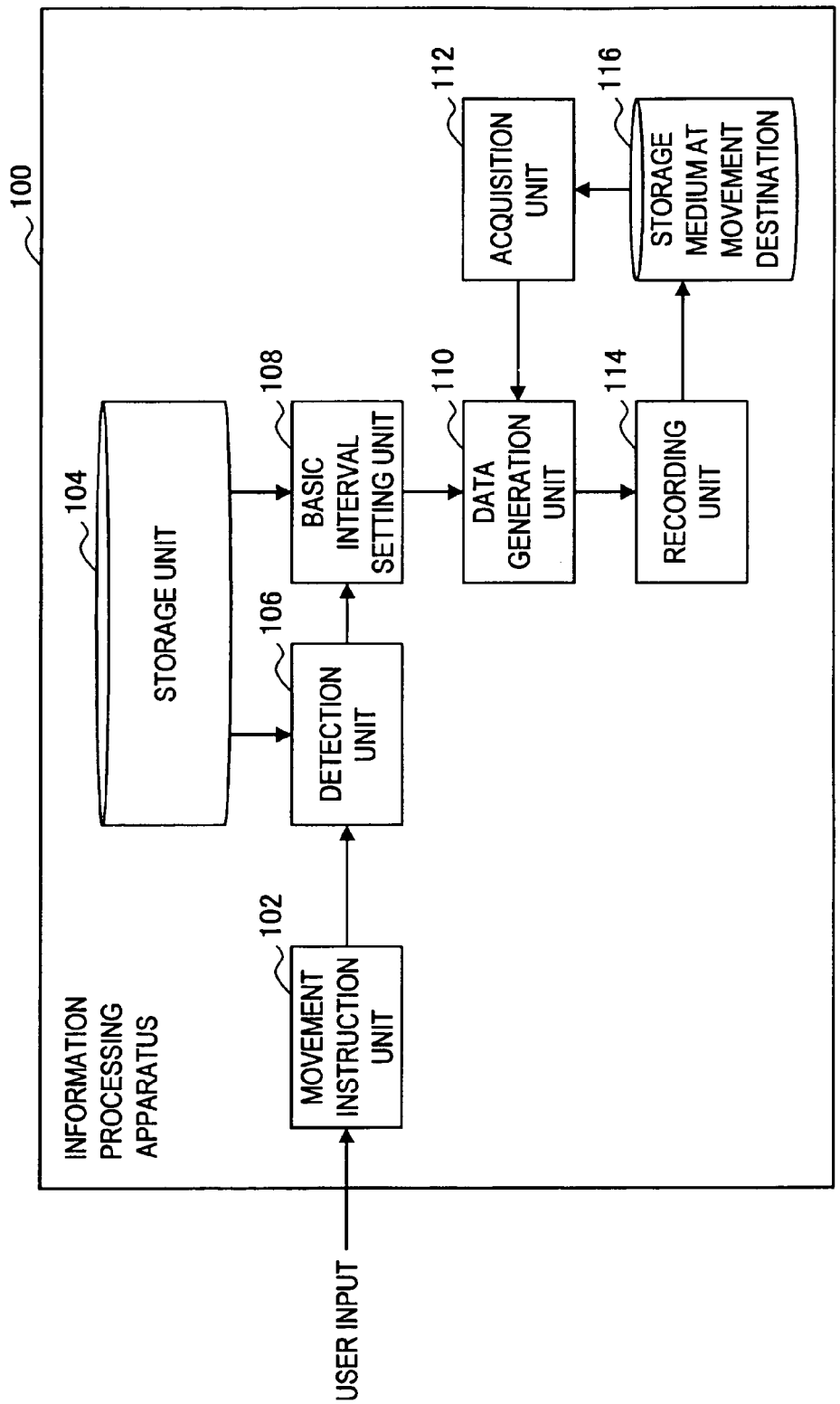
FIG. 1 is a block diagram showing a functional configuration of an information processing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

"DETAILED DESCRIPTION OF THE EMBODIMENTS" will be described according to the order shown below.

[1] Purpose of the Present Invention
[2] Configuration of Information Processing Apparatus
[3] Overview of AVCHD Format
[4] Operation of Information Processing Apparatus

[1] Purpose of the Present Invention

First, the purpose of the present embodiment will be described. With increasing recording capacities of disk-type recording media in recent years, camcorders of a type that stores moving images or still images on a disk instead of conventional recording tape are emerging on the market. Disk-type recording media can randomly be accessed and thus, desired scenes can efficiently be found out and also because data is accessed in a non-contact fashion, information recording media can be used without being deteriorated. For example, DVD, HDD, or flash memory camcorders attract an increasing number of users year after year thanks to excellent image quality and ease of use such as editing capabilities.

When content such as moving images is recorded in an information recording medium, processing to together generate and record information different from entity data of the content according to a predetermined data format such as AVCHD is performed. The information different from entity data of the content is, for example, attribute information such as the size or reproduction time of content data or interval information set to content data. The interval information is a pair of information of a start point and an end point of a predetermined interval set for the content data.

A plurality of pieces of interval information can normally be set for one piece of content data. It is also possible to create a reproduction list (play list) by designating a plurality of intervals set for a plurality of content data or to make a copy to another information recording medium. If, for example, a characteristic portion of moving image content recorded in an information recording medium is designated by user input, only an interval containing the characteristic portion can be collected and moved to another medium.

However, there is an issue that in order to move content data desired by the user to another medium, it is necessary for the user to search for a characteristic portion of the content data and repeat a copying operation. There is also an issue that it is difficult to move designated content data from content data recorded in accordance with the desired capacity or time.

Thus, an information processing apparatus 100 according to an embodiment of the present invention has been developed by bearing the above circumstances in mind. According to the information processing apparatus 100 in the present embodiment, a digest of content data can be moved in accordance with the desired capacity or time.

[2] Configuration of Information Processing Apparatus

Next, the functional configuration of the information processing apparatus 100 according to an embodiment of the present invention will be described with reference to FIG. 1. FIG. 1 is a block diagram showing the functional configuration of the information processing apparatus 100 according to an embodiment. As shown in FIG. 1, the information processing apparatus 100 includes a movement instruction unit 102, a storage unit 104, a detection unit 106, a basic interval setting unit 108, a data generation unit 110, an acquisition unit 112, a recording unit 114, a storage medium 116 at a movement destination, and the like.

In the present embodiment, content data such as video imaged or recorded by an apparatus separate from the information processing apparatus 100 is recorded in the storage unit 104. The content data recorded in the storage unit 104 is recorded according to a predetermined data recording format. Here, recording formats to record content data include the AVCHD format, BDAV format, and BDMV format. In the description that follows, the AVCHD format is exemplified as a recoding format to store content data such as video. The AVCHD format will be described later in detail.

The movement instruction unit 102 has a function to instruct movement of content data stored in the storage unit 104 in accordance with a user operation. The user provides instructions of movement of content data by operating an input apparatus (not shown) such as a keyboard, touch panel, or button. The movement instruction unit 102 to which movement instructions are input by the user notifies the detection unit 106 of the instructions to move content data.

The storage unit 104 is, for example, a storage medium such as a nonvolatile memory such as an EEPROM (Electrically Erasable Programmable Read-Only Memory) and EPROM (Erasable Programmable Read Only Memory), a magnetic disk such as a hard disk and disc-like magnetic disk, an optical disk such as CD-RW (Compact Disc ReWritable), DVD (Digital Versatile Disc)-RW//+RW/RAM (Random Access Memory), and BD (Blu-ray Disc (registered trademark))-RE, an MO (Magneto Optical) disk, a flash memory, and a memory card using the same.

Content data recorded in the storage unit 104 is a moving image stream (AV stream) imaged by an imaging apparatus or the like and is recorded in units of predetermined intervals. A unit of predetermined intervals may be, for example, an interval unit between a time at which the user starts recording and a time at which the user finishes recording or a basic interval unit set according to the AVCHD format.

The storage unit 104 also has attribute information of content data together with actual content data recorded therein. The attribute information is face information contained in content data, time information of content data, and the like. If content data is imaged by an imaging apparatus, recording start information, still image simultaneous recording operation information while moving images being shot, zoom operation information, panning operation information, exposure correction information, information about a motion vector of an input image, color information, focus information, volume information, position information by GPS can be exemplified as attribute information.

Also, a case where the information changes or a case where a predetermined threshold is exceeded is recorded as attribute information. Further, when content data recorded in the storage unit 104 is reproduced, the number of times of reproduction, change in reproduction speed, still image recording operation from moving images during reproduction, marker record attached to preference points while the content data is reproduced are recorded as attribute information.

The detection unit 106 has a function to detect characteristic information of content data recorded in the storage unit 104 in accordance with movement instructions of the content data by the movement instruction unit 102. Here, the characteristic information is information to be noticed by the user of the above attribute information of content data. For example, face information contained in content data, information about change in video, and information about recording of a still image from moving images during reproduction are considered to be characteristic information to be noticed by the user. The detection unit 106 detects such characteristic information and provides information about the type, time, and the like of the detected characteristic information to the basic interval setting unit 108.

The basic interval setting unit 108 has a function to set one or two or more basic intervals to content data based on detection points of characteristic information of content data detected by the detection unit 106. Settings of a basic interval by the basic interval setting unit 108 are made by setting a start point (hereinafter, also called an IN point) of the basic interval and an end point (hereinafter, also called an OUT point) of the basic interval to content data. For example, the detection point of characteristic information may be set as the start point of a basic interval and the point at which a predetermined time passes from the detection point of characteristic information as the end point of the basic interval. Alternatively, the detection point of characteristic information may be set as the end point of a basic interval and a predetermined point prior to the detection point of characteristic information as the start point of the basic interval.

That is, a point obtained by adding a positive/negative time offset to the detection point of time becomes an IN point. The offset value may be a fixed value or a random value. Alternatively, the IN point may be a time at which a fixed interval or a random time interval passes from the time of detection point. Similarly, an OUT point is a point by adding a positive/negative time offset to the detection point of time and the offset value may be a fixed value or a random value. Alternatively, the OUT point may be a time at which a fixed interval or a random time interval passes from the IN point. If the interval between the detection point of characteristic information and the recording end point of content data is not equal to or more than a predetermined time, the basic interval setting unit 108 may be made not to set a basic interval.

The basic interval setting unit 108 may select a chapter in which a basic interval should be set to set an IN point and an OUT point in the selected chapter. Alternatively, any point in the selected chapter may be set as an IN point or an OUT point. Further, an IN point or an OUT point may be set in chapters, in dates, or by selecting all chapters. For example, an IN point and an OUT point may be set by selecting content data recorded in summer holidays of content data recorded throughout the year. Accordingly, an IN point and an OUT point can be set to user-desired content data.

The data generation unit 110 has a function to generate content data for movement made of one or two or more basic intervals set by the basic interval setting unit 108. If a plurality of basic intervals contained in the generated content data for movement is overlapped, the data generation unit 110 may delete one overlapped basic interval. The data generation unit 110 may generate content data for movement using a fixed number of basic intervals from basic intervals set by the basic interval setting unit 108.

Alternatively, as described later, content data for movement may be generated using the number of basic intervals in accordance with the capacity or the like of the storage medium 116 at the movement destination. Further, when content data for movement is generated using the same content data, the data generation unit 110 may generate different content data for movement or the same content data for movement each time content data for movement is generated.

Figure 2:
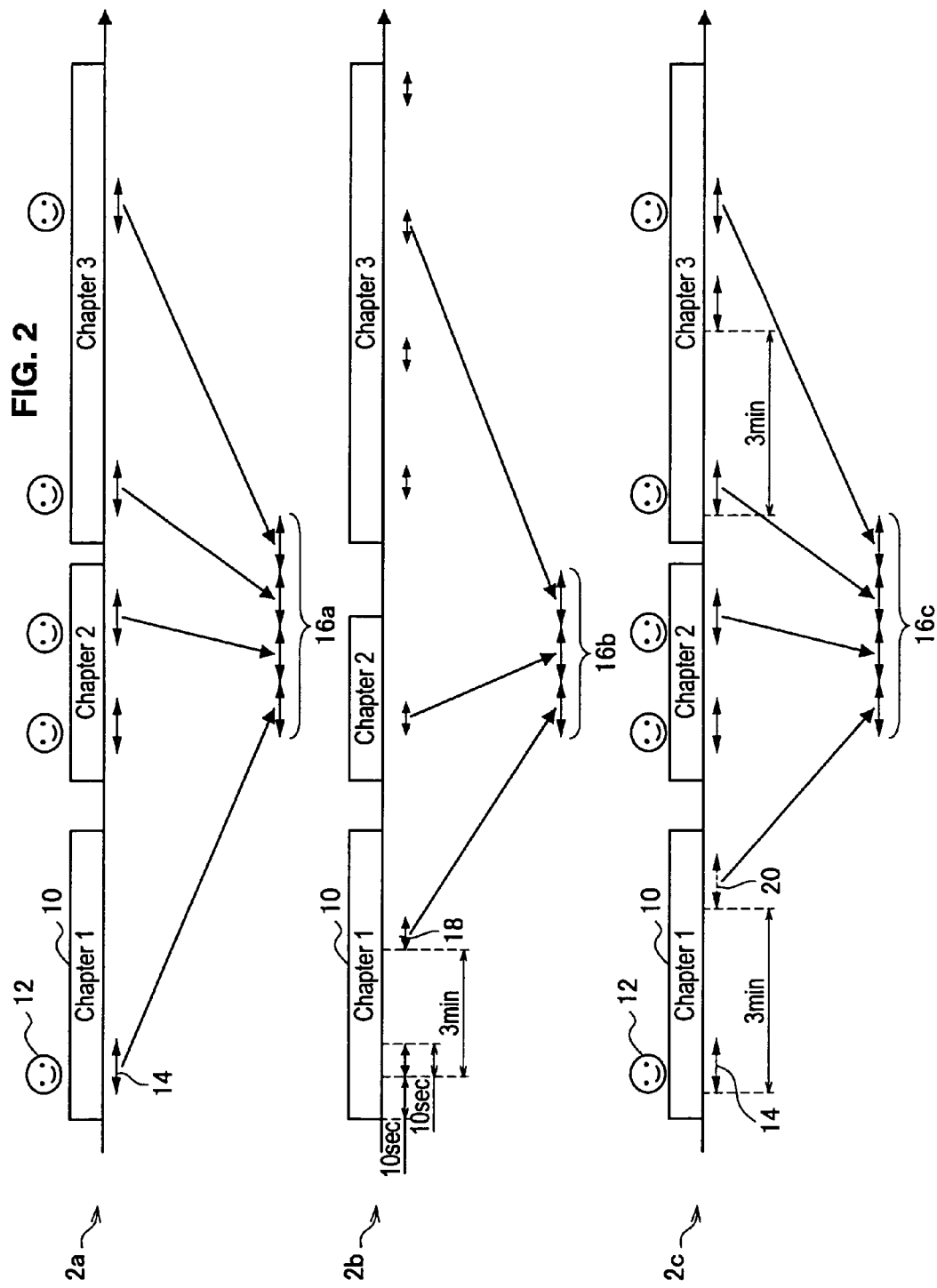
FIG. 2 is an explanatory view illustrating basic interval settings and generation of data for movement according to the embodiment.

Here, basic interval settings and generation of data for movement will be described with reference to FIG. 2. FIG. 2 is an explanatory view illustrating basic interval settings and generation of data for movement. FIG. 2(a) shows a case in which face information is detected as characteristic information and FIG. 2(b) and FIG. 2(c) show cases in which face information and time information are detected as characteristic information.

In the example in FIG. 2(a), the IN point is set as "face information detection time−2 sec" and the OUT point as 10 seconds after the IN point. As shown in FIG. 2(a), face information contained in Chapter 1, Chapter 2, and Chapter 3 is detected. If, for example, a face 12 contained in Chapter 1 is detected, "detection time of the face 12−2 sec" is set as the IN point. The OUT point is set 10 seconds after the IN point and then, a basic interval 14 is set. Similarly, face information contained in Chapter 2 and Chapter 3 is detected before each basic interval is set.

Then, a predetermined number of basic intervals are extracted from set basic intervals before data for movement 16*a* is generated. The number of extracted basic intervals may be decided in accordance with the total time of three chapters. Alternatively, basic intervals may be extracted in accordance with the total time of each chapter such as extracting two basic intervals from Chapter 3 having a longer total time and one basic interval from each of the other chapters.

In the examples in FIG. 2(*b*) and FIG. 2(*c*), the IN point is set as "face information detection time−2 sec", "start time of the chapter+10 sec", or "last IN point setting time+3 min". The OUT point is set, like FIG. 2(*a*), seconds after the IN point. If, for example, no face information is contained in recorded content data, like the example in FIG. 2(*b*), a basic interval 18 is set based on only time information. If, like the example in FIG. 2(*c*), face information is contained in content information, the basic interval 14 is set based on the detection time of the face 12 and a basic interval 20 is set based on time information. Extraction of basic intervals and generation of data for movement 16*b* and 16*c* in the examples in FIG. 2(*b*) and FIG. 2(*c*) are the same as those in FIG. 2(*a*).

In the foregoing, basic interval settings and generation of data for movement have been described. Returning to FIG. 1, the recording unit 114 has a function to record content data for movement generated by the data generation unit 110 in the storage medium 116, which is a different movement destination from the storage unit 104. The storage medium 116 at the movement destination is, for example, a storage medium such as a nonvolatile memory such as an EEPROM (Electrically Erasable Programmable Read-Only Memory) and EPROM (Erasable Programmable Read Only Memory), a magnetic disk such as a hard disk and disc-like magnetic disk, an optical disk such as CD-RW (Compact Disc ReWritable), DVD (Digital Versatile Disc)-RW//+RW/RAM (Random Access Memory), and BD (Blu-ray Disc (registered trademark))-RE, an MO (Magneto Optical) disk, a flash memory, and a memory card using the same.

The acquisition unit 112 has a function to acquire information about the storage medium 116 at the movement destination. The information about the storage medium 116 at the movement destination is, for example, capacity information of the storage medium 116 at the movement destination or information about the medium type. The acquisition unit 112 provides various kinds of acquired information about the storage medium 116 at the movement destination to the data generation unit 110.

The data generation unit 110 generates content data for movement based on information about the storage medium 116 at the movement destination provided by the acquisition unit 112. For example, the data generation unit 110 may generate content data for movement in accordance with the magnitude relation between the storage capacity of the storage medium 116 at the movement destination and the data capacity of content data recorded in the storage unit 104. If the storage capacity of the storage medium 116 at the movement destination is smaller than the data capacity of content data, the data generation unit 110 may generate content data for movement in accordance with the storage capacity of the storage medium 116 at the movement destination.

Alternatively, the data generation unit 110 may generate content data for movement in accordance with the type of medium of the storage medium 116 at the movement destination provided by the acquisition unit 112. For example, if the type of medium of the storage medium 116 at the movement destination is a flash memory or memory card, the data generation unit 110 may generate content data for movement and if the type of medium is BD or DVD, the data generation unit 110 may not generate content data for movement.

Alternatively, the data generation unit 110 may decide whether to generate content data for movement in accordance with a user operation. If, for example, the storage capacity of the storage medium 116 at the movement destination is smaller than the capacity of content data, the content data may be desired to be copied by using a plurality of the storage media 116. In such a case, all content data recorded in the storage unit 104 may be recorded in the storage medium 116 at the movement destination while generation of content data for movement is prevented by a user operation.

Alternatively, the data generation unit 110 may generate content data for movement so that the content data fits into the time set in accordance with a user operation. In the foregoing, the functional configuration of the information processing apparatus 100 has been described. Next, details of the AVCHD format, which is an example of the data recording format in the present embodiment, will be described.

[3] Details of AVCHD Format

The AVCHD format will be described with reference to FIGS. 3 to 5. The AVCHD format is a recording format that records an AV stream, in which video data and audio data are multiplexed, on a recordable recording medium. A moving image stream imaged by a camcorder or the like is encoded into an MPEG2-TS stream and recorded in a recording medium as a file when recorded according to the AVCHD format. This file is referred to as a clip AV stream file (or AV stream file).

A clip AV stream file is a management unit in a file system and is not necessarily a management unit that is easy to understand for the user. When convenience of the user is considered, it is necessary to record a mechanism to reproduce video content divided into a plurality of clip AV streams by putting together the video content into one file and information to reproduce a portion of the clip AV stream file on a recording medium as a database. According to the AVCHD format, moving image content, attribute information of the content and the like can be recorded as a database.

Next, a data structure specified by the AVCHD format will be described. The data structure specified by the AVCHD format has four layers. The lowest layer is a layer (called a clip layer) where the clip AV stream is arranged. The layer thereon is a layer (called a play list layer) where PlayList and PlayItem to specify the reproduction location of the clip AV stream are arranged. Further, the layer thereon is a layer (called an object layer) where MovieObject including commands to specify the reproduction order and the like for the play list is arranged. The highest layer is a layer (called an index layer) where an index table to manage titles and the like stored on a recording medium is arranged.

The clip layer will be described. As described above, a clip AV stream is a bit stream in which video data and audio data are multiplexed into the form of MPEG2 TS (transport stream) form or the like. Information about the clip AV stream is recorded in a file as clip information. A clip AV stream file and a clip information file in which clip information corresponding to the file is recorded are considered as one object and also called a clip. That is, a clip is one object including a clip AV stream and clip information.

Next, the play list layer will be described. A play list includes designation of an AV stream file to be reproduced and a collection of reproduction start points (IN points) and reproduction end points (OUT points) to specify reproduction locations of the designated AV stream file. A pair of information of the reproduction start point and reproduction end point is called PlayItem. A corresponding interval in the clip is reproduced based on IN point and OUT point information in PlayItem in the play list.

Next, the object layer will be described. MovieObject includes terminal information that links a navigation command program with MovieObject. The navigation program is a command (navigation command) to control reproduction of the play list.

Next, the index layer will be described. The index layer includes Index Table. Index Table is a top-level table that defines the titles of content recorded on a recording medium. Reproduction of the recording medium is controlled by a module manager in system software resident in a player based on title information stored in Index Table.

Figure 3:
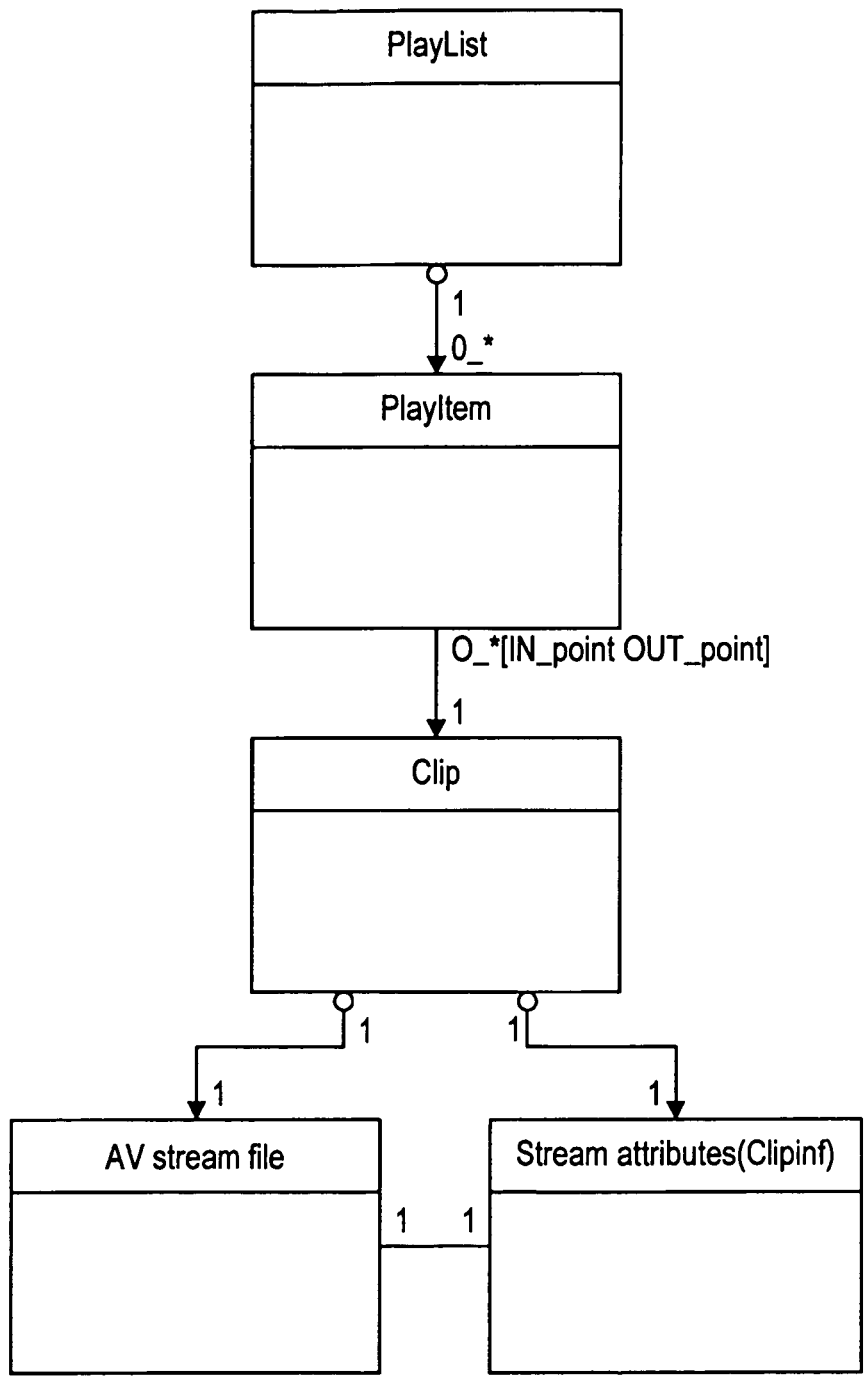
FIG. 3 is an explanatory view illustrating an AVCHD format according to the embodiment.

FIG. 3 is a UML (Unified Modeling Language) diagram showing relationships among the above AV stream, clip information (Stream Attributes), clip, PlayItem, and PlayList. PlayList is associated with one or a plurality of PlayItems and PlayItem is associated with one clip. A plurality of PlayItems each having a different start point and/or a different end point can be associated with one clip. One clip AV stream file is referenced from one clip. Similarly, one clip information file is referenced from one clip. The clip AV stream file and the clip information file have a one-to-one correspondence. By defining such a structure, a non-destructive reproduction order for reproducing arbitrary portion without changing the AV stream file can be designated.

Figure 4:
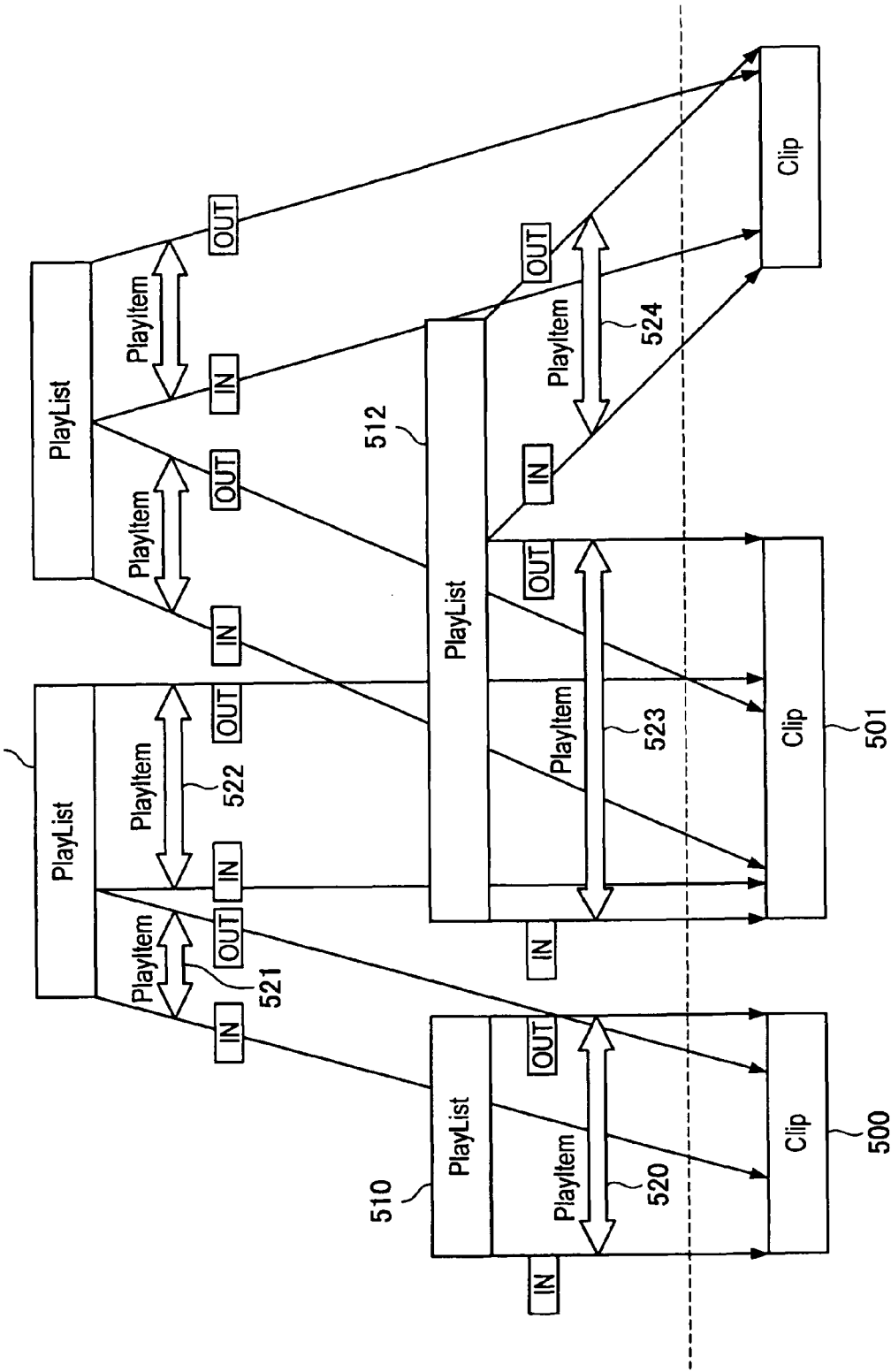
FIG. 4 is an explanatory view illustrating the AVCHD format according to the embodiment.

As shown in FIG. 4, the same clip can be referenced from a plurality of PlayLists. Also, a plurality of clips can be designated from one PlayList. A clip is referenced based on the IN point and OUT point indicated by PlayItem in PlayList. In FIG. 4, a clip 500 is referenced from PlayItem 520 of PlayList 510 and also an interval of the clip 500 indicated by an IN point and an OUT point is referenced from PlayItem 521 of PlayItems 521 and 522 constituting PlayList 511. Also, an interval of a clip 501 indicated by an IN point and an OUT point of PlayItem 523 of PlayItems 523 and 524 of PlayList 512 is referenced. In FIG. 4, the clip 501 is further referenced by another PlayList.

When the user shoots an image or makes a recording by an imaging apparatus or the like, the above clips and PlayList are generated by repeating the start and stop of recording processing. For example, one PlayItem is created for each interval when the user starts recording and ends recording or a clip AV stream file is generated by one breakpoint of a recorded/imaged stream. With generation of a clip AV stream file, a clip information file is also created. Thus, one clip becomes a unit that needs continuous synchronous reproduction, that is, reproduction whose real-time reproduction is guaranteed.

Each time the user starts recording, an entry mark (EntryMark) is attached to the head of PlayItem. While there is a condition that EntryMark should typically be put on the head of PlayList compatible with moving images, the position of the EntryMark can be moved on a temporal axis by a predetermined editing operation.

Each EntryMark becomes a position where, as a chapter start point, the user can access a stream. Therefore, an interval divided by adjacent EntryMarks becomes the minimum editing unit, that is, a "chapter" visible from the user. The reproduction order of PlayLists is defined by arranging PlayItems in order of reproduction. In the present embodiment, one AV stream generated by recording being started and stopped by the user is also called a chapter.

Next, a management structure of files recorded on a recording medium according to the AVCHD format will be described using FIG. 5. Files recorded on a recording medium according to the AVCHD format are hierarchically managed by a directory structure. First, one directory (a root directory in FIG. 5) is created on the recording medium. The range under this directory is where one recording and reproducing system manages.

Figure 5:
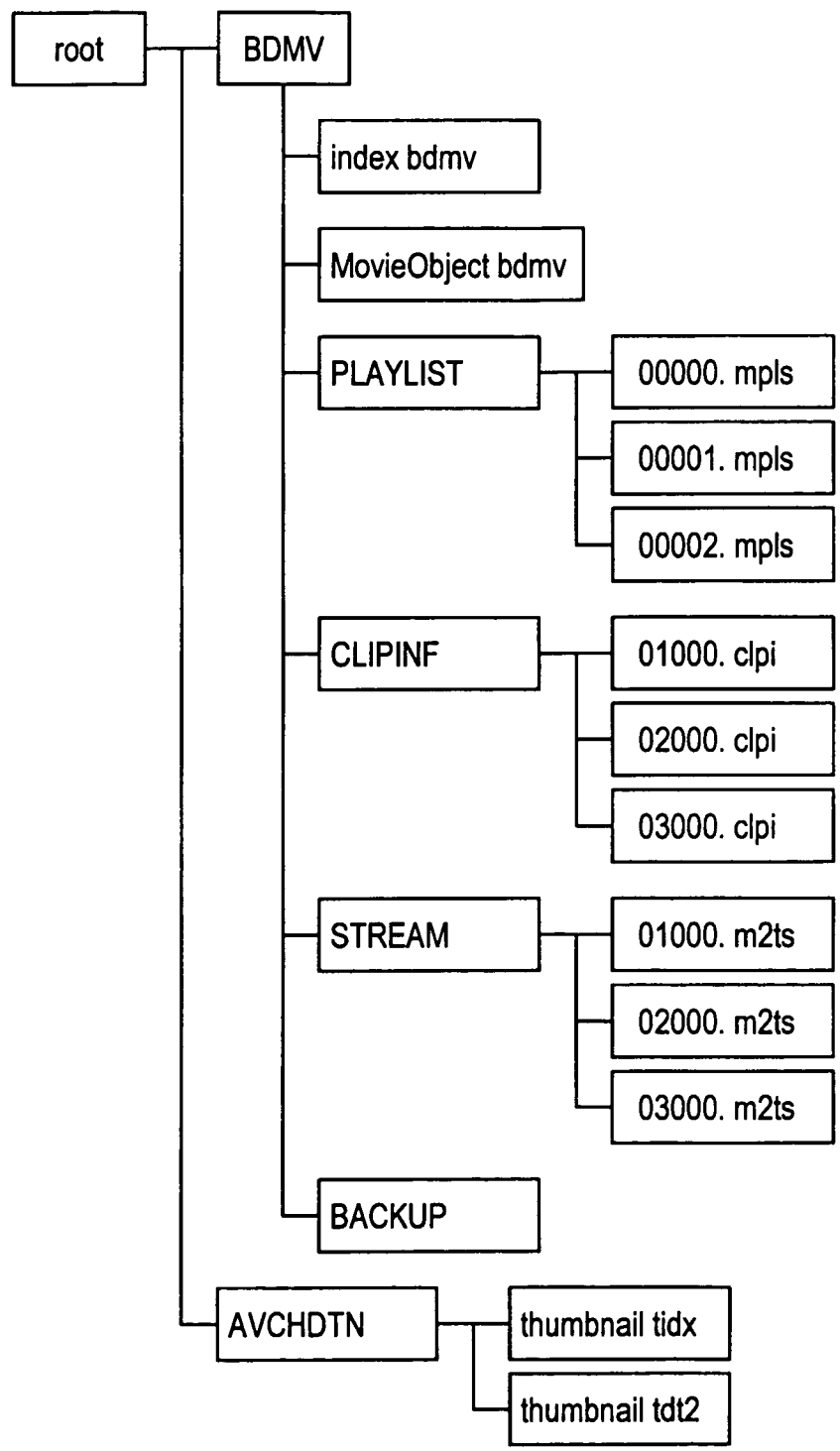
FIG. 5 is an explanatory view illustrating the AVCHD format according to the embodiment.

A directory "PLAYLIST" shown in FIG. 5 is a directory where a database of PlayList is placed. That is, the directory "PLAYLIST" includes a file "xxxxx.mpls", which is a file related to PlayList. The file "xxxxx.mpls" is a file created for each PlayList.

A directory "CLIPINF" is a directory where a database of clips is placed. That is, the directory "CLIPINF" includes a file "zzzzz.clip", which is a clip information file for each clip AV stream file. A directory "STREAM" is a directory where an AV stream file as an entity is placed. That is, the directory "STREAM" includes a clip AV stream file corresponding to each clip information file. The clip AV stream file is made of MPEG2 TS and the file name thereof is set as "zzzzz.m2ts". By adopting the same file name excluding the extension as that of the corresponding clip information file, the correspondence between the clip information file and the clip AV stream file can easily be grasped. In the foregoing, the AVCHD format has been described.

[4] Operation of Information Processing Apparatus

Next, details of operation of the information processing apparatus 100 will be described. FIGS. 6 to 12 are flow charts each showing an information processing method by the information processing apparatus 100. In the method for creating content data for movement in the information processing apparatus 100 described below, a start point (IN point) of a basic interval is set by the basic interval setting unit 108 by the "time at which unspecified face information is detected+offset" and "randomly selecting the time". An end point (OUT point) of the basic interval is set after a predetermined time from the IN point. Basic intervals are set for all recorded content data. Moreover, one basic interval is made one chapter by setting EntryMark to each basic interval. Each time content data for movement is automatically created after a movement instruction button or the like is pressed by the user, different content data for movement with a different basic interval designated is generated. The total time of content data for movement is decided in accordance with the capacity of the storage medium 116 at the movement destination or the reproduction time designated by the user.

Figure 6:
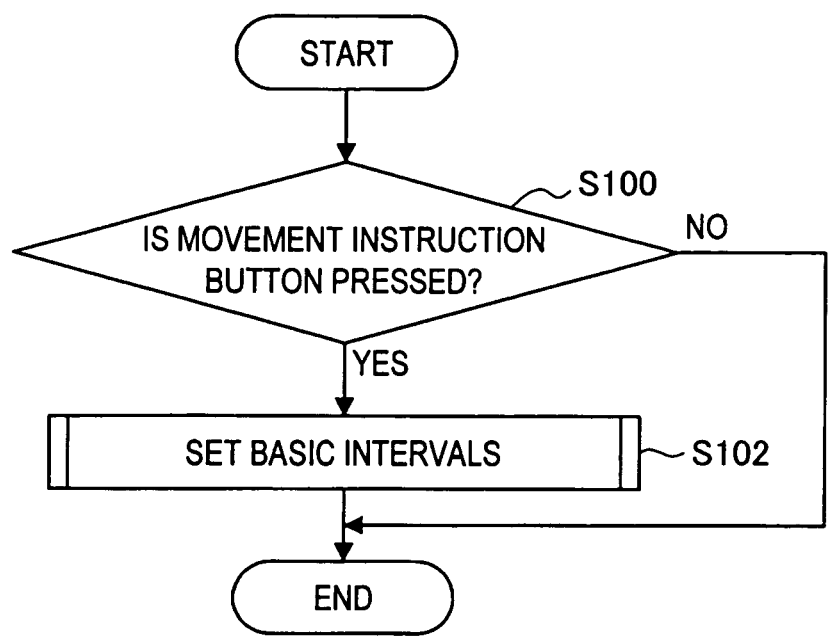
FIG. 6 is a flow chart showing basic interval setting processing according to the embodiment.
Figure 7:
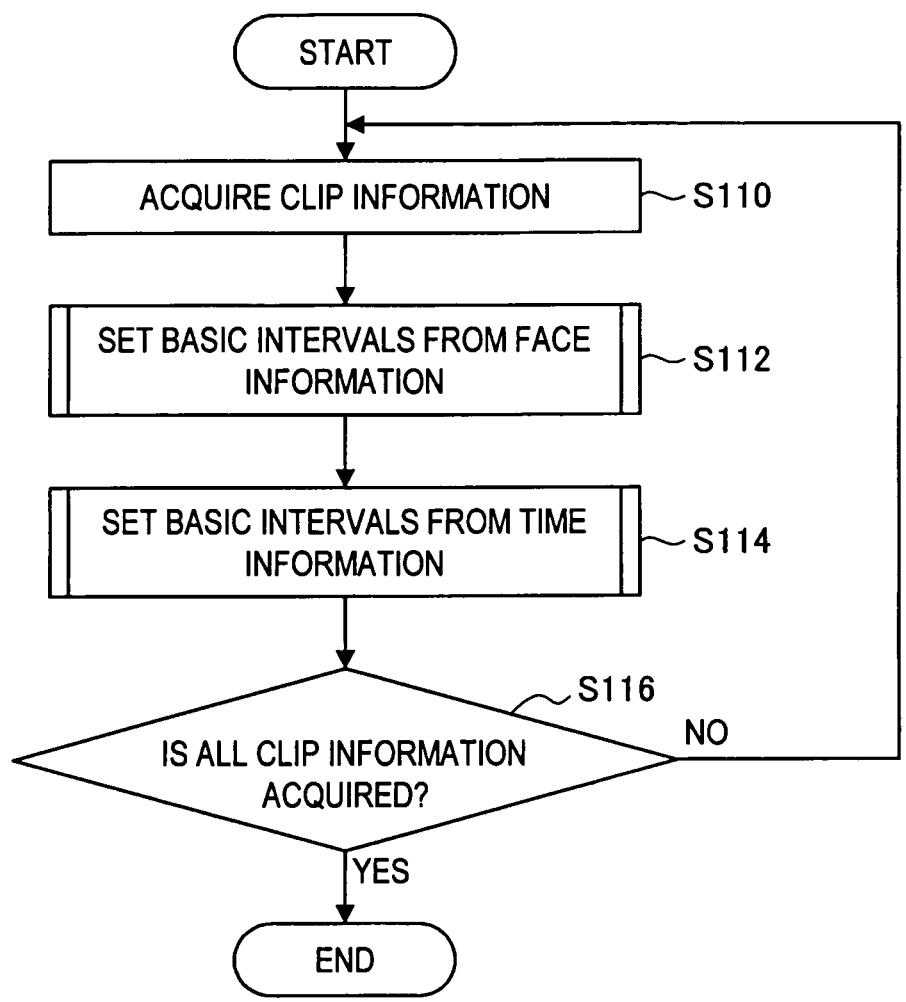
FIG. 7 is a flow chart showing details of the basic interval setting processing according to the embodiment.

FIG. 6 is a flow chart showing basic interval setting processing by the information processing apparatus 100. As shown in FIG. 6, first, whether the movement instruction button has been pressed by the user is determined via a user input unit (not shown) (S100). If it is determined at step S100 that the movement instruction button has been pressed, the movement instruction unit 102 provides instructions to move content data stored in the storage unit 104 and basic interval setting processing is performed (S102). The basic interval setting processing will be described in detail with reference to FIG. 7. FIG. 7 is a flow chart showing details of the basic interval setting processing.

Figure 8:
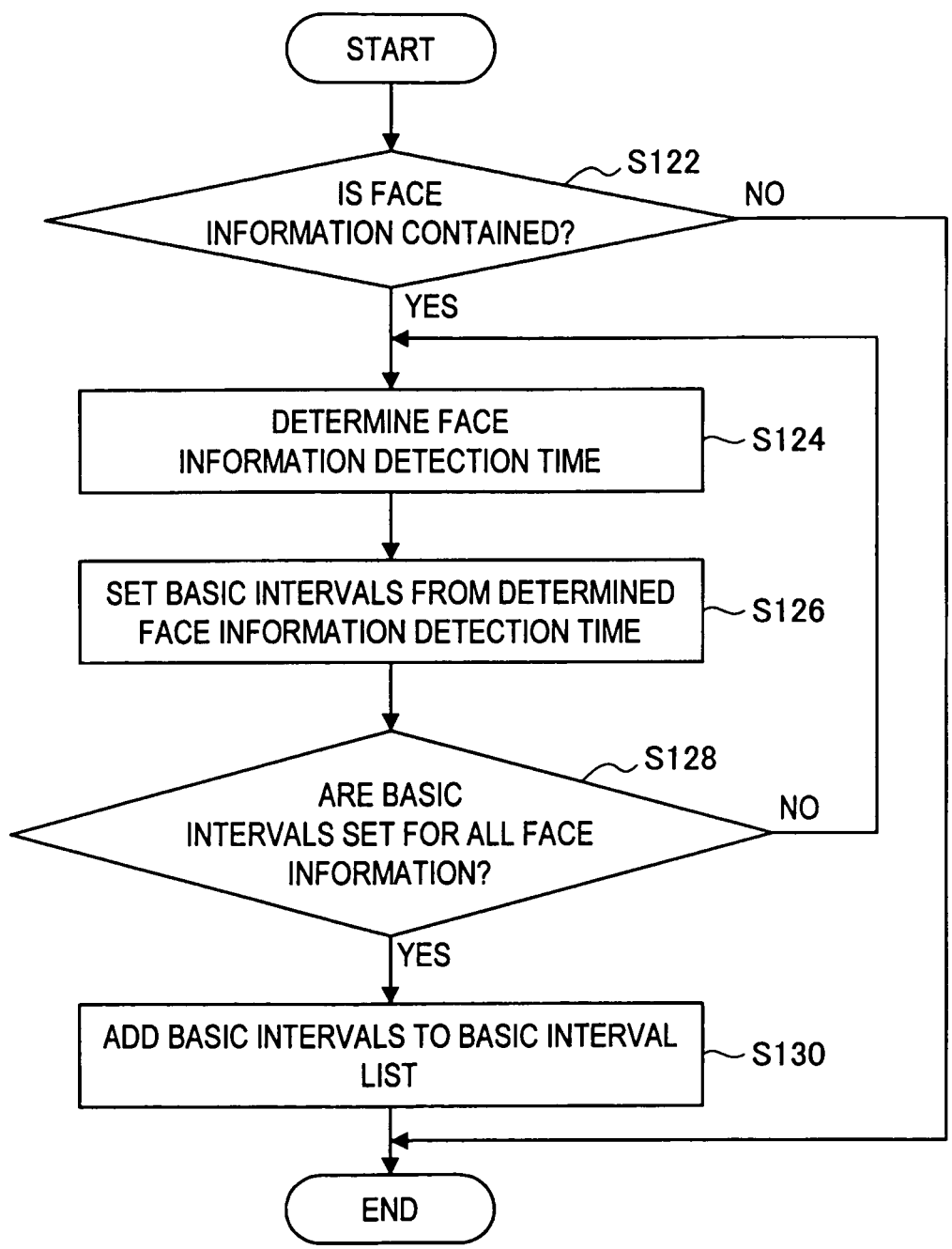
FIG. 8 is a flow chart showing processing to set basic intervals from face information according to the embodiment.

As shown in FIG. 7, the basic interval setting unit 108 first acquires clip information of the target content data (S110). Then, the basic interval setting unit 108 sets basic intervals from face information (S112). Here, processing to set basic intervals from face information will be described in detail with reference to FIG. 8. FIG. 8 is a flow chart showing processing to set basic intervals from face information.

As shown in FIG. 8, the basic interval setting unit 108 determines whether face information is contained in the clip information acquired at step S110 (S122). If it is determined at step S122 that no face information is contained, processing is terminated.

If it is determined at step S122 that face information is contained in the clip information, the basic interval setting unit 108 determines a face information detection time (S124). Then, the basic interval setting unit 108 sets a basic interval based on the face information detection time determined at step S124 (S126). At step S126, for example, the basic interval is set by setting the IN point as "face information detection time−2 sec" and the OUT point as "IN point+10 sec". If the OUT point is outside the total time of content data at step S126, basic interval settings may be abandoned.

Then, the basic interval setting unit 108 determines whether basic intervals have been set for all face information (S128). If it is determined at step S128 that basic intervals have been set for all face information, the basic interval setting unit 108 adds basic intervals set at step S126 to a basic interval list (S130). At step S130, size information of basic intervals is added to the basic interval list together with the basic intervals. If it is determined at step S128 that basic intervals have not been set for all face information, the basic interval setting unit 108 repeats processing at steps S124 to S128.

Figure 9:
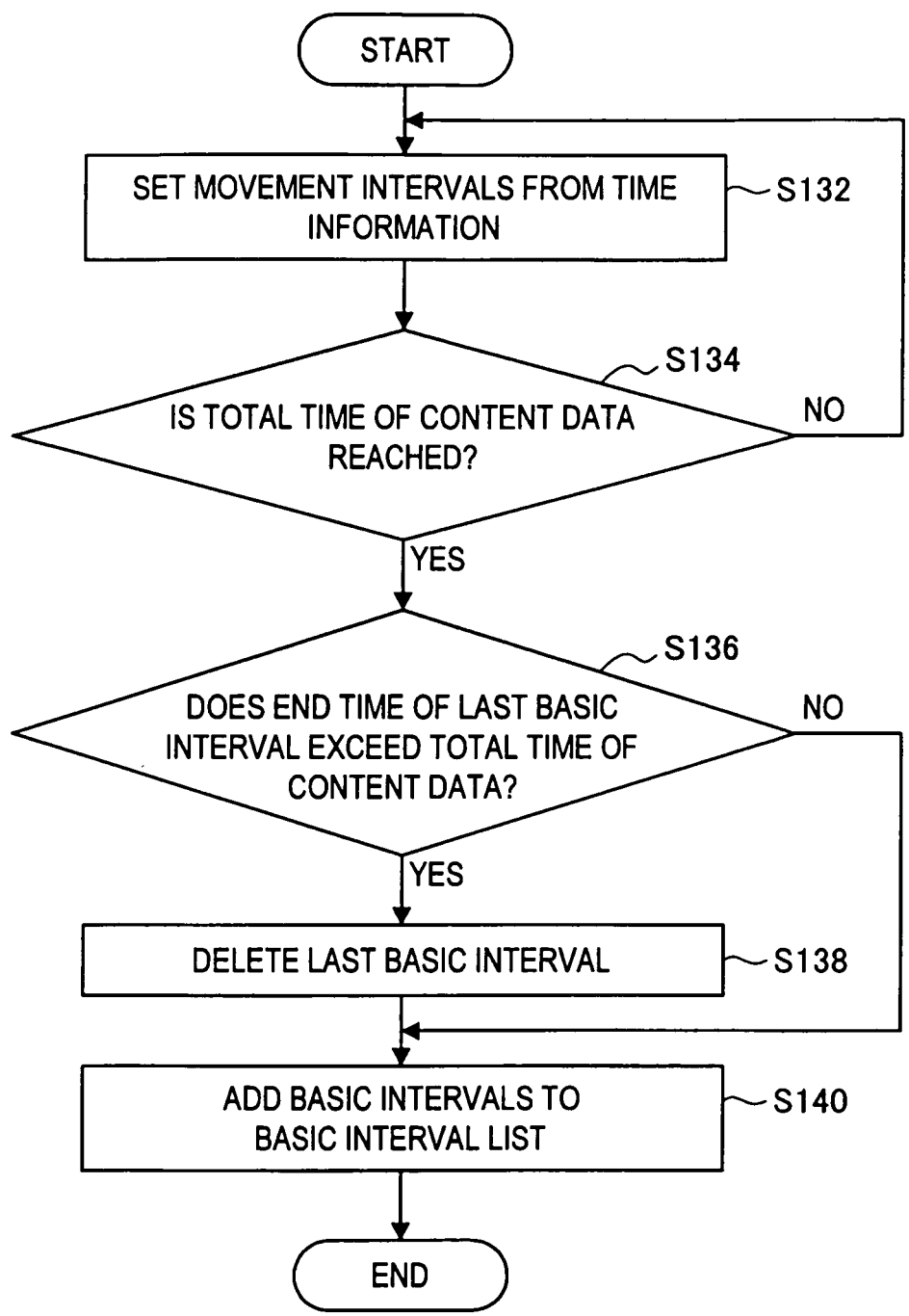
FIG. 9 is a flow chart showing processing to set basic intervals from time information according to the embodiment.

Returning to FIG. 7, after basic intervals is set from face information at step S112, the basic interval setting unit 108 sets basic intervals from time information (S114). Processing to set basic intervals from time information will be described in detail with reference to FIG. 9. FIG. 9 is a flow chart showing processing to set basic intervals from time information. As shown in FIG. 9, the basic interval setting unit 108 sets basic intervals from time information (S132). At step S132, for example, the IN point is set as "chapter start position+10 sec" or "position where the IN point is set last time+3 min" and the OUT point as "IN point+10 sec".

Next, whether the total time of content data is reached is determined (S134). If the total time of content data is not reached at step S134, processing at steps S132 to S134 is repeated. If it is determined at step S134 that the total time of content data is reached, whether the end time (OUT point) of the last basic interval set at step S132 exceeds the total time of content data is determined (S136). If it is determined at step S136 that the OUT point does not exceed the total time, the basic interval setting unit 108 performs processing at step S140.

If it is determined at step S136 that the OUT point exceeds the total time, the basic interval setting unit 108 deletes the last basic interval set last at step S132 (S138). Then, the basic interval setting unit 108 adds basic intervals (excluding the last basic interval if the last basic interval is excluded at step S138) set at step S132 to the basic interval list (S140). The above steps S134 to S138 may be performed in processing to set basic intervals from face information at step S112.

Returning to FIG. 7, whether all clip information is acquired is determined (S116). If it is determined at step S116 that all clip information is not acquired, processing at steps S110 to S116 is repeated. If it is determined at step S116 that all clip information is acquired, processing is terminated.

Figure 10:
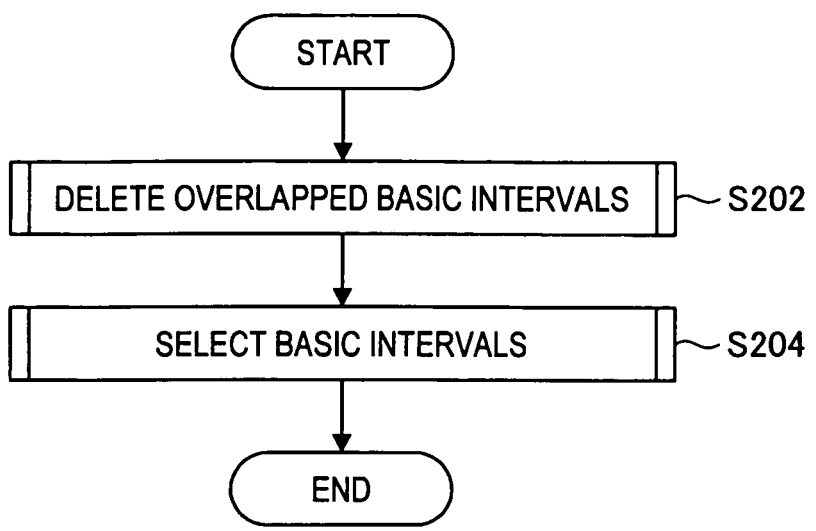
FIG. 10 is a flow chart showing generation processing of content data for movement according to the embodiment.
Figure 11:
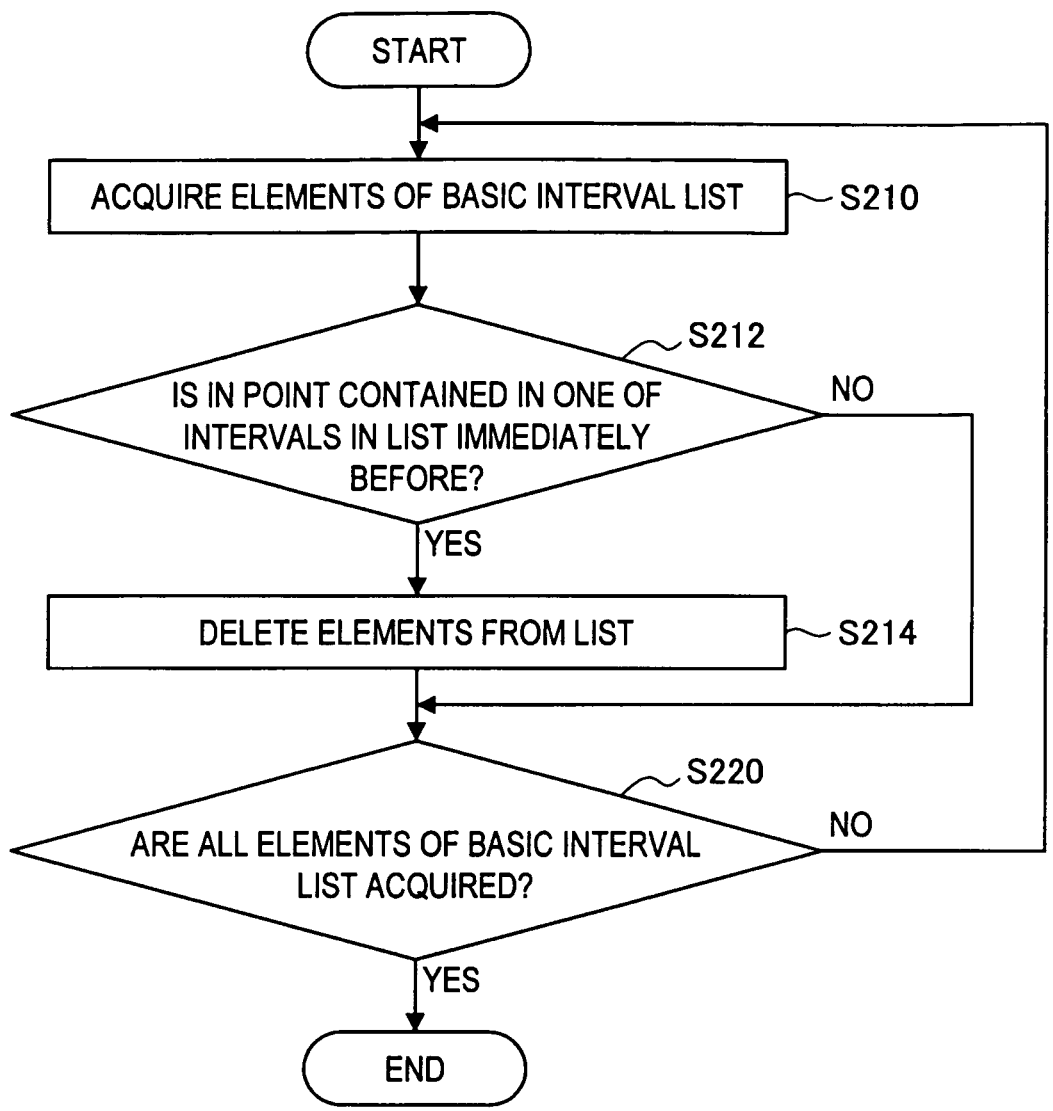
FIG. 11 is a flow chart showing deletion processing of a duplicated basic interval according to the embodiment.
Figure 12:
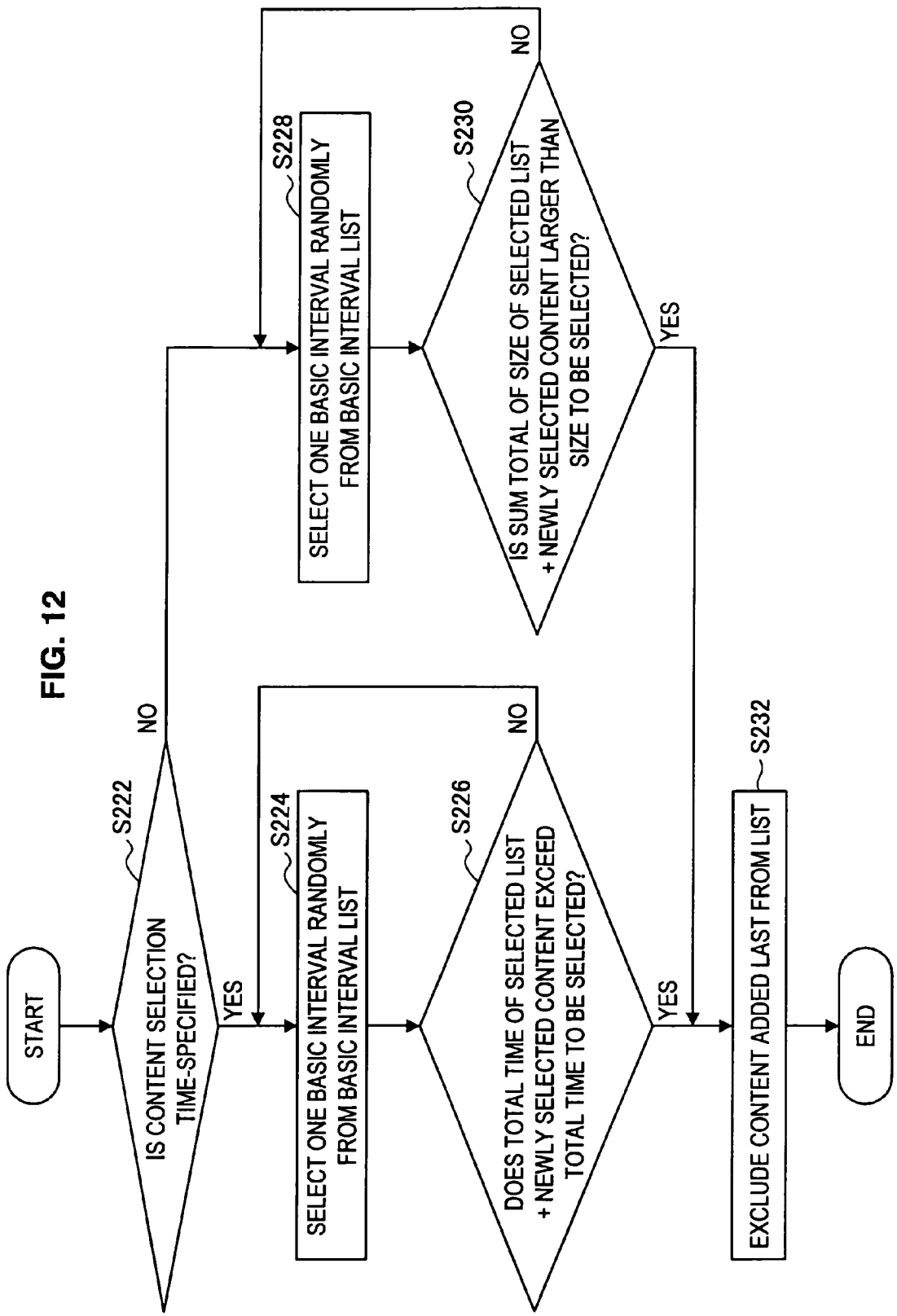
FIG. 12 is a flow chart showing selection processing of the basic interval according to the embodiment.

Next, generation processing of content data for movement will be described with reference to FIGS. 10 to 12. FIG. 10 is a flow chart showing generation processing of content data for movement. As shown in FIG. 10, the data generation unit 110 first performs deletion processing of overlapped basic intervals (S202). Details of the deletion processing of overlapped basic intervals will be described with reference to FIG. 11. As shown in FIG. 11, elements of a basic interval list are first acquired (S210).

Elements of the list of basic intervals acquired at step S210 indicate setting information such as IN points/OUT points of basic intervals and the like. Then, the data generation unit 110 determines whether an IN point of a basic interval is contained in one of intervals of the list immediately before (S212). That an IN point of a basic interval is contained in one of intervals of the list immediately before means that the IN point is contained in the interval set by the IN point/OUT point of the basic interval immediately before.

If it is determined at step S212 that the IN point is contained in one of intervals of the list immediately before, the data generation unit 110 deletes elements of the basic interval list acquired at step S210 from the basic interval list (S214). Then, the data generation unit 110 determines whether all elements of the basic interval list are acquired (S220) and if it is determined that all elements of the basic interval list are acquired, processing is terminated. If it is determined at step S220 that all elements of the basic interval list are not acquired, processing at steps S210 to S220 is repeated.

Returning to FIG. 10, after deletion processing of overlapped basic intervals is performed at step S202, selection processing of basic intervals is performed (S204). The selection processing of basic intervals will be described in detail with reference to FIG. 12. As shown in FIG. 12, the data generation unit 110 first determines whether the selection of basic intervals is time-specified when content data for movement is generated (S222). The case in which the selection of basic intervals is time-specified at step S222 is a case in which content data for movement is generated in accordance with the total time. When the selection of basic intervals is not time-specified, the selection of basic intervals is capacity-specified and, for example, content data for movement is generated in accordance with the total capacity.

If it is determined at step S222 that the selection of basic intervals is time-specified, the data generation unit 110 randomly selects one basic interval from the basic interval list (S224). Then, the data generation unit 110 determines whether the total time of the selected list and content data newly selected at step S224 exceeds the specified total time (S226). If it is determined at step S226 that the total time exceeds the specified total time, the content added to the list last is excluded from the list (S232). If it is determined at step S226 that the total time does not exceed the specified total time, processing at steps S224 and S226 is repeated.

If it is determined at step S222 that the selection of basic intervals is not time-specified, that is, capacity-specified, the data generation unit 110 randomly selects one basic interval from the basic interval list (S228). Then, the data generation unit 110 determines whether the sum total of size of the selected list and that of content data newly selected at step S228 exceeds the specified total size (S230). If it is determined at step S230 that the sum total exceeds the total size, the content added to the list last is excluded from the list (S232). If it is determined at step S230 that the sum total does not exceed the total size, processing at steps S228 and S230 is repeated.

In the foregoing, the information processing method in the information processing apparatus 100 has been described. Thanks to the information processing apparatus 100, the user can collect only intervals to be noticed from content data and copy a digest of content data of only user-desired intervals only by pressing an input button such as a movement instruction button. Moreover, content data for movement can be generated in accordance with capacity information or time information of a storage medium at the copying destination and thus, time and efforts to select content or delete selected content can be reduced.

It should be understood by those skilled in the art that various modifications, combinations, sub-combinations and alterations may occur depending on design requirements and other factors insofar as they are within the scope of the appended claims or the equivalents thereof.

For example, a case in which recordings are made in the same format is exemplified in the above embodiment, but the present invention is not limited to such an example. When, for example, content data is copied in different formats, content data for movement may be generated by adding a capacity when copies are made in different formats.

What is claimed is:

1. An information processing apparatus having a non-transitory computer readable storage medium, said apparatus comprising:
    an interval setting unit that sets one or two or more intervals to content data based on characteristic information of the content data, in which each interval starts from a point based on characteristic information and ends a predetermined time after start; and
    a data range setting unit that sets a range of the content data to copy or move, the range is made of a plurality of the one or two or more intervals set by the interval setting unit,
    wherein a start point of a respective interval is obtained by adding an offset value to a time associated with the respective characteristic information,
    wherein the content data comprises a plurality of chapters, and
    wherein the interval setting unit sets the interval or intervals in accordance with a total time of each chapter.

2. The information processing apparatus according to claim 1, wherein when the plurality of intervals contained in the content data to copy or move is overlapped, the data range setting unit deletes one of the overlapped ranges.

3. The information processing apparatus according to claim 1, further comprising:
    a recording unit that records the range of the content data to copy or move set by the data range setting unit in a second storage medium different from a first storage unit which stores the content; and
    an acquisition unit that acquires information about the second storage medium, wherein the data range setting unit sets the range of the content data to copy or move based on the information about the second storage medium acquired by the acquisition unit.

4. The information processing apparatus according to claim 3, wherein the data range setting unit sets the range of the content data to copy or move in accordance with a magnitude relation between a storage capacity of the second storage medium and a data capacity of the content data.

5. The information processing apparatus according to claim 3, wherein the data range setting unit sets the range of the content data to copy or move in accordance with the storage capacity of the second storage medium when the storage capacity of the second storage medium is smaller than the data capacity of the content data.

6. The information processing apparatus according to claim 3, wherein the data range setting unit sets the range of the content data to copy or move in accordance with a medium type of the second storage medium.

7. The information processing apparatus according to claim 3, wherein the data range setting unit sets the range of the content data to copy or move in accordance with the data capacity of the content data.

8. The information processing apparatus according to claim 1, wherein the offset value is a fixed value.

9. The information processing apparatus according to claim 1, wherein the offset value is a random value.

10. An information processing method for use with an information processing apparatus for copying or moving data from one non-transitory computer readable storage medium to another non-transitory computer readable storage medium, said method comprising:
    setting one or two or more intervals to content data based on characteristic information of the content data, in which each interval starts from a point based on characteristic information and ends a predetermined time after start; and
    setting a range of the content data to copy or move, the range being made of a plurality of the one or two or more set intervals,
    wherein a start point of a respective interval is obtained by adding an offset value to a time associated with the respective characteristic information,
    wherein the content data comprises a plurality of chapters,
    wherein the setting of the one or two or more intervals sets the interval or intervals in accordance with a total time of each chapter, and
    wherein the setting of the one or two or more intervals and the setting of the range of the content data are performed by a processing apparatus.

11. The information processing method according to claim 10, wherein the offset value is a fixed value.

12. The information processing method according to claim 10, wherein the offset value is a random value.

13. A non-transitory computer readable memory having stored thereon a program for causing a computer to function as an information processing apparatus, the program comprising:
    setting one or two or more intervals to content data based on characteristic information of the content data, in which each interval starts from a point based on characteristic information and ends a predetermined time after start; and
    setting a range of the content data to copy or move, the range being made of a plurality of the one or two or more set intervals,
    wherein a start point of a respective interval is obtained by adding an offset value to a time associated with the respective characteristic information,
    wherein the content data comprises a plurality of chapters, and
    wherein the setting of the one or two or more intervals sets the interval or intervals in accordance with a total time of each chapter.

14. The non-transitory computer readable memory according to claim 13, wherein the offset value is a fixed value.

15. The non-transitory computer readable memory according to claim 13, wherein the offset value is a random value.

* * * * *